United States Patent [19]

Plunkett

[11] 4,320,331

[45] Mar. 16, 1982

[54] TRANSISTORIZED CURRENT CONTROLLED PULSE WIDTH MODULATED INVERTER MACHINE DRIVE SYSTEM

[75] Inventor: Allan B. Plunkett, Scotia, N.Y.

[73] Assignee: General Electric Company, Schenectady, N.Y.

[21] Appl. No.: 80,479

[22] Filed: Oct. 1, 1979

[51] Int. Cl.³ .............................................. H02P 7/58
[52] U.S. Cl. .................................. 318/722; 318/723; 318/802; 318/805; 318/808; 318/809; 318/812
[58] Field of Search ................................ 318/798–803, 318/805, 807–809, 812, 716–717, 702, 720, 722, 723

[56] References Cited

U.S. PATENT DOCUMENTS

| | | | |
|---|---|---|---|
| 3,500,158 | 3/1970 | Landau et al. | 318/805 |
| 3,775,649 | 11/1973 | Bayer et al. | 318/702 |
| 3,794,894 | 2/1974 | Van Leer | 318/702 |
| 3,813,589 | 5/1974 | Boice | 318/702 |
| 3,849,709 | 11/1974 | Berman et al. | 318/798 |
| 4,008,428 | 2/1977 | Waldmann et al. | 318/807 |

Primary Examiner—David Smith, Jr.
Assistant Examiner—Eugene S. Indyk

Attorney, Agent, or Firm—William H. Steinberg; James C. Davis, Jr.; Marvin Snyder

[57] ABSTRACT

An alternating current machine drive system, comprised of an alternating current machine and an inverter configured of a plurality of pairs of transistors with the transistors of each pair coupled in series-aiding fashion and each of the pairs of serially coupled transistors connected across a direct current source, is controlled in accordance with inverter current. The transistors of each inverter transistor pair are alternately rendered conductive to supply alternating current at the inverter output in accordance with a current error signal, proportional to the difference in magnitude between actual inverter phase current and a sinusoidal reference signal, with the conduction state of the transistors of each pair reversing each time the current error signal exceeds an upper and lower hysteresis limit, which limits vary in accordance with actual inverter phase current. Conditioning of inverter output voltage to control machine speed and torque is achieved by varying the sinusoidal reference signal frequency and amplitude, respectively, in accordance with operator commands. Optimum inverter machine drive performance is achieved by regulating the sinusoidal reference signal amplitude and frequency in accordance with a feedback machine torque signal and a feedback machine flux signal, respectively.

15 Claims, 4 Drawing Figures ized alternating current machine drive system
which is regulated in accordance with inverter output
current to provide maximum machine torque at minimum peak harmonic current.

TRANSISTORIZED CURRENT CONTROLLED PULSE WIDTH MODULATED INVERTER MACHINE DRIVE SYSTEM

BACKGROUND OF THE INVENTION

This invention relates generally to alternating current machine drive systems, and more specifically, to a transistorized alternating current machine drive system which is regulated in accordance with inverter output current to provide maximum machine torque at minimum peak harmonic current.

In alternating current machine applications where regulation of machine speed and torque is desired, inverter machine drive systems are employed. Typically, an inverter machine drive systems comprises an alternating current machine, either a synchronous or induction type machine, which is supplied with alternating current from a direct current source, usually a phase controlled rectifier, by an inverter. Such inverters are commonly configured of a plurality of pairs of switching devices, with the switching devices of each pair coupled in series-aiding fashion and each of the pairs of serially-coupled switching devices coupled across the direct current source and connected at the junction between serially coupled switching devices to a respective machine phase. When the switching devices of each pair are alternately rendered conductive in sequence, alternating current is supplied by the inverter to the machine. By conditioning the alternating current supplied by the inverter, that is, by varying the frequency and duration of inverter switching device conduction, machine speed and torque, respectively, can be controlled accordingly.

Heretofore, each of the switching devices of each pair of inverter switching devices has usually been comprised of a thyristor. The application of high current transistors to alternating current machine drive system inverters has been limited because of the extreme sensitivity of present day transistors to excessive peak currents. A typical transistorized inverter-alternating current machine drive system subjects inverter transistors to peak currents of a magnitude in excess of twice the dc inverter link or energizing current. Unfortunately, inverter transistors cannot be protected against such peak currents by fuses, thus requiring that inverter link current to be limited to protect inverter transistors, thereby limiting inverter operating range.

The present invention concerns a transistorized inverter-machine drive system which is regulated in accordance with inverter phase current so that peak inverter currents are limited while machine torque is maximized, thereby providing satisfactory machine drive system performance. By regulating the inverter-machine drive system in accordance with inverter phase current, sensitivity of the machine drive system to machine parameter variations is minimized.

BRIEF SUMMARY OF THE INVENTION

Briefly, in accordance with the preferred embodiment of the invention, an alternating current machine drive system capable of supplying maximum torque at minimum peak harmonic current comprises a multiphase alternating current machine which is supplied with alternating current from a dc energized inverter with each phase component of inverter output current varying in frequency and amplitude in accordance with one of a plurality of inverter switching signals, corresponding in number to the number of multiphase machine phases, which are supplied to the inverter by a control circuit. The control circuit includes a reference signal generator which generates a multiphase reference signal, usually sinusoidal, with the frequency and amplitude of the multiphase reference signal varying in accordance with a designated machine phase angle relationship magnitude and with a designated current amplitude, respectively. A plurality of current regulators, corresponding in number to the number of multiphase machine phases, are each coupled to the multiphase machine and to the reference signal generator. Each current regulator provides a current error signal proportional to the difference in magnitude between a respective phase component of actual inverter current and a respective phase component of the multiphase reference signal and supplies the inverter with a respective one of the plurality of inverter switching signals in accordance with the deviation in magnitude of the current error signal from the respective actual inverter current phase component.

It is an object of the present invention to provide an alternating current machine drive system which is regulated in accordance with inverter current to provide maximum machine torque;

It is another object of the present invention to provide an alternating current machine drive system which is regulated in accordance with inverter current to minimize peak harmonic currents.

BRIEF SUMMARY OF THE DRAWINGS

The features of the invention believed to be novel are set forth in the appended claims. The invention itself, however, both as to method of organization and operation, together with further objects and advantages thereof, may best be understood by reference to the following description taken in conjunction with the accompanying drawings in which:

FIG. 3a is a graphical representation with respect to time of one of the switching signals generated by the control apparatus of FIG. 2; and FIG. 3b is a graphical representation with respect to time of the current error signal, and actual inverter current produced when the machine drive system of FIG. 1 is controlled by the control circuit of FIG. 2.

DETAILED DESCRIPTION OF THE PREFERRED EMBODIMENT

Figure 1:
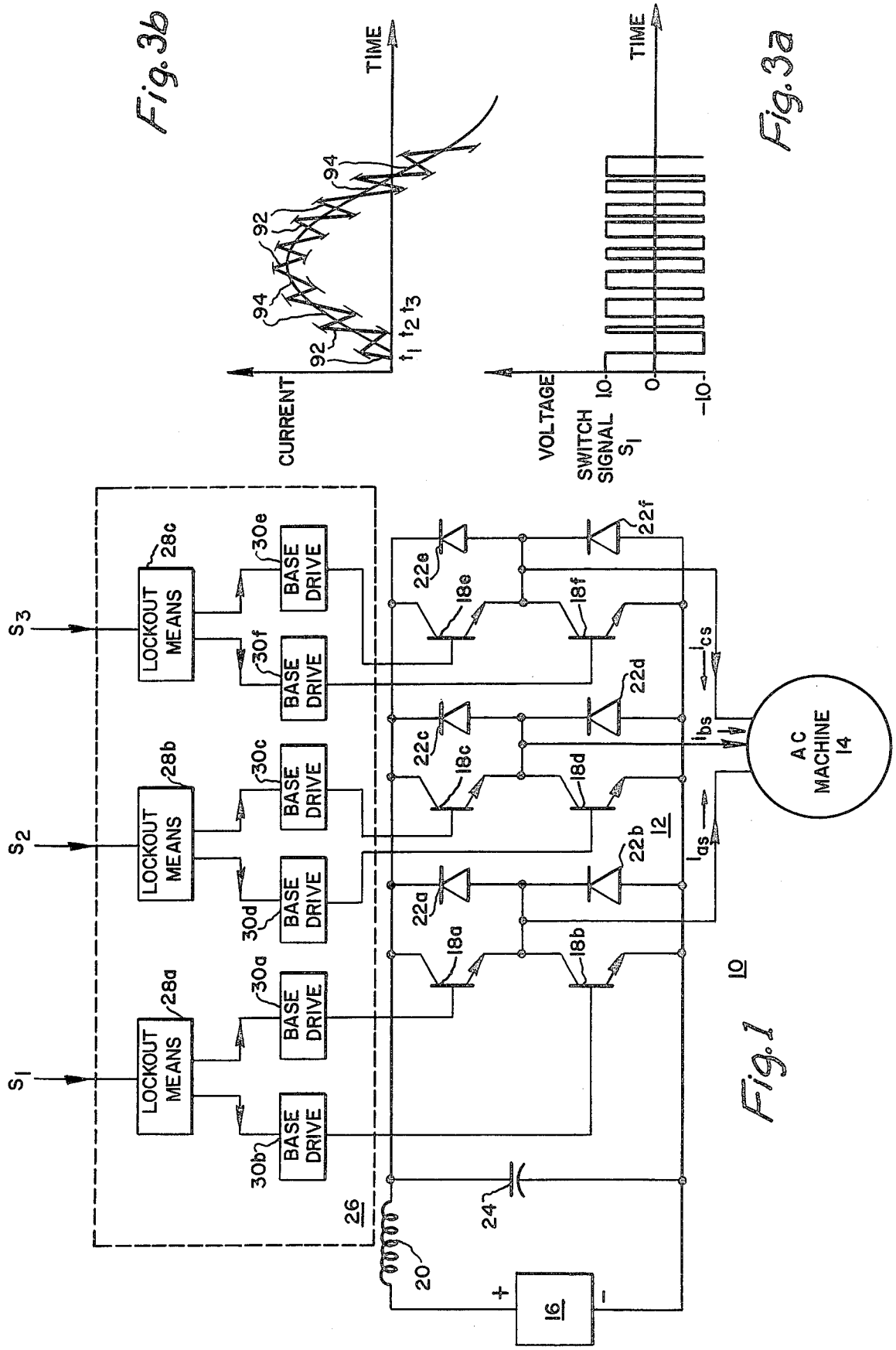
FIG. 1 is a schematic diagram of an inverter alternating current machine drive system according to the present invention.

FIG. 1 illustrates an alternating current machine drive system 10 according to the present invention. Machine drive system 10 comprises an inverter 12 which supplies alternating current to an ac machine 14, which may be either an induction or synchronous type machine, from a direct current source 16, which is usually a rectifier. In the presently preferred embodiment, ac machine 14 is configured of a three phase machine and inverter 12 therefore comprises three pairs of switching devices, shown as transistors 18a and 18b, 18c and 18d and 18e and 18f, respectively, with transistors of each pair coupled in series aiding fashion, and each of transistor pairs 18a and 18b, 18c and 18d and 18e and 18f coupled across direct current source 16. The junction between transistors 18a and 18b, transistors 18c and 18d, and transistors 18e and 18f, respectively, is coupled to one of three phases of machine 14, respectively. Typically, each of transistors 18a–18f comprises a high current NPN transistor. Coupled in parallel opposition with the collector-emitter portion of each of transistors 18a–18f is one of diodes 22a–22f, respectively. Each of diodes 22a–22f provides a conductive path across an associated one of transistors 18a–18f, respectively, for reactive and machine load current so that a defined voltage appears across each of the three phases of machine 14. A filter capacitor 24 is coupled in parallel with transistor pairs 18a and 18b, 18c and 18d and 18e and 18f, respectively, and further filters the voltage supplied by direct current source 16.

Each of the transistors of transistor pairs 18a and 18b, 18c and 18d, and 18e and 18f is rendered conductive by transistor firing logic means 26 in accordance with digital switching signals, $S_1$, $S_2$ and $S_3$, respectively, supplied to transistor firing logic means 26 by a control circuit (not shown). Transistor firing logic means 26 comprises three identically configured lock-out circuits 28a, 28b and 28c, respectively, which are each coupled to transistor base drive circuit pairs 30a and 30b, 30c and 30d and 30e and 30f, respectively. Each lock-out circuit, such as lock-out circuit 28a, for example, renders one of the base drive circuits of an associated pair of transistor base drive circuits, such as base drive circuit pair 30a and 30b, for example, operative in accordance with the digital switching signal supplied to the lock-out circuit. When rendered operative by the lock-out circuit, the base drive circuit supplies forward base drive current to an associated one of inverter transistors 18a–18f, respectively, to render the transistor conductive. Each of lock-out circuits 28a, 28b and 28c, respectively, is adjusted such that when one of the base drive circuits of each of transistor base drive circuit pairs 30a and 30b, 30c and 30d and 30e and 30f, respectively, is rendered operative, the remaining base drive circuit of each pair is prevented from becoming operative to render an associated inverter transistor conductive for a period of time, for example, 25μ seconds, following the instant the then-operative base drive circuit becomes inoperative. In this manner, simultaneous conduction of both of the transistors of each of inverter transistor pairs 18a and 18b, 18c and 18d and 18e and 18f is prevented.

Various lock-out circuits exist and selection of an appropriate lock-out circuit will depend on design characteristics. Therefore, the details of lock-out circuits 28a, 28b and 28c are not shown. For a further, more detailed discussion of such lock-out circuits, reference should be had to U.S. Pat. No. 3,919,620 issued on Nov. 11, 1975 to McMurray, Plunkett and Sitt and assigned to the assignee of the present invention.

During inverter 12 operation, machine 14 is supplied with alternating currents that are in three phase relationship with one another when the transistors of transistor pairs 18a and 18b, 18c and 18d and 18e and 18f are alternately rendered conductive in sequence by transistor firing logic means 26. By controlling the conduction duration of each transistor, inverter output voltage amplitude, and hence, ac machine torque, can be regulated accordingly. By controlling transistor conduction frequency, inverter output frequency, and hence ac machine speed can be adjusted accordingly. Control of inverter output voltage amplitude and frequency by regulation of the conduction duration and conduction frequency, respectively, of inverter switching devices is commonly referred to as "pulse width modulation". For a further understanding of pulse width modulation operation of inverter machine drive systems, reference should be had to the paper "Pulse Width Modulated Motor Drives with Improved Modulation" by A. Abbondanti et al., published in the conference record of the 9th Annual IEEE/IAS Meeting 1974, Vol. IA-11, No. 6, November/December 1975.

Present day methods for achieving pulse width modulation inverter-machine drive operation, such as the triangle interception technique described in detail in the above-identified paper, suffer from several disadvantages. One disadvantage of such present day methods for achieving pulse width modulation inverter drive system operation is that such present day methods are extremely sensitive to variations in inverter output voltage. From the relationship $\Delta v/r_s = \Delta i$ where $\Delta v$ is the variation in inverter output voltage, $\Delta i$ is the variation in inverter output current and $r_s$ is the machine stator resistance, it can be seen that even small variations in inverter output voltage result in large variations in inverter output current owing to the usually small magnitude of $r_s$. Secondly, such present day methods for achieving pulse width modulation inverter-drive system operation invariably require a special transition mode to allow the inverter to transition between pulse width modulation operation and square wave operation. Operating the inverter-machine drive system in the transition mode usually requires special, complex control circuitry, thereby greatly increasing the machine drive system cost.

Figure 2:
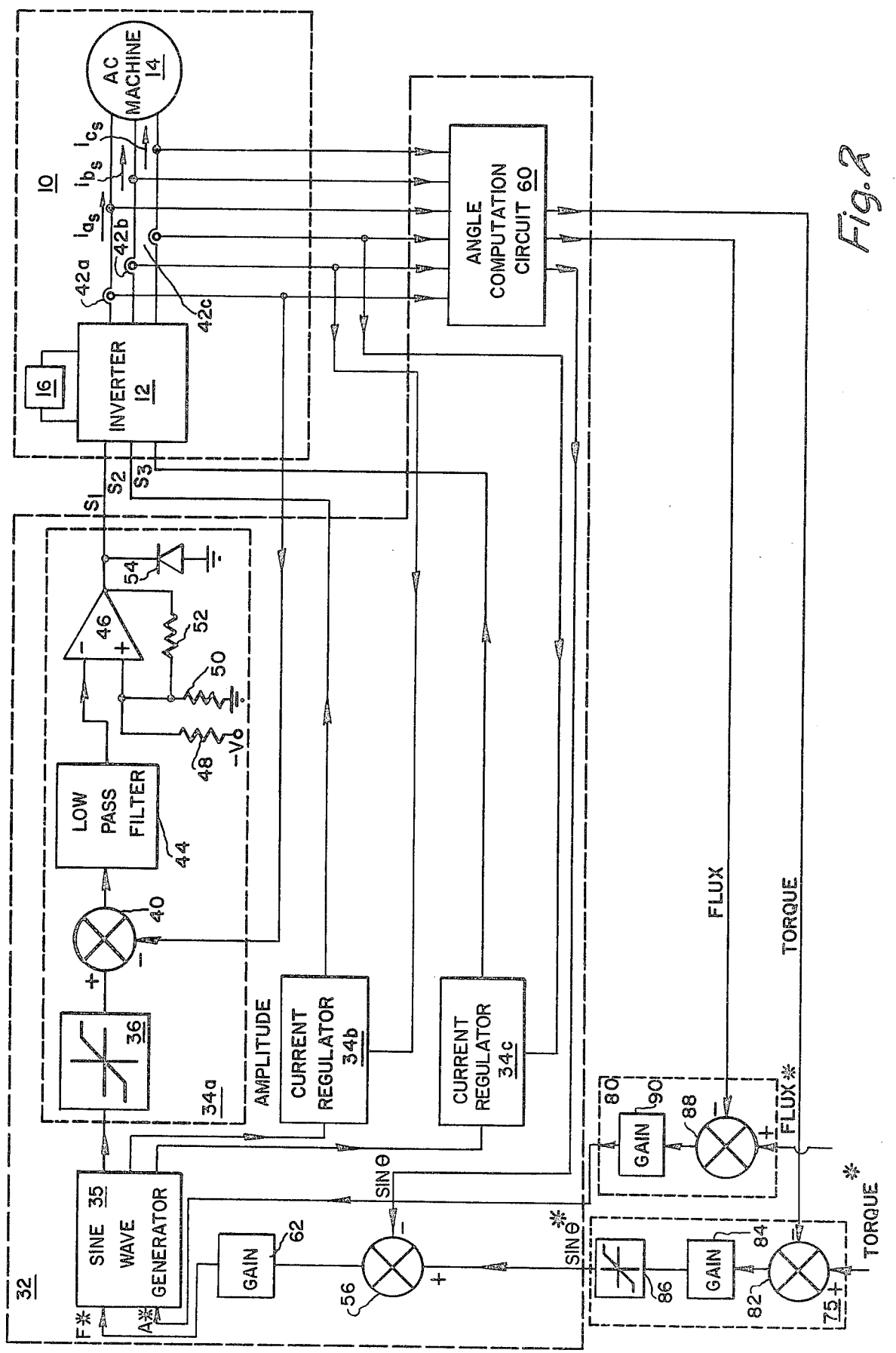
FIG. 2 is a part block, part schematic diagram of the control circuit of the present invention for use with the machine drive system of FIG. 1.

To avoid the disadvantages incurred with present day techniques for achieving pulse width modulation inverter operation, inverter 12 of FIG. 1 is pulse width modulated in accordance with inverter current by a control apparatus 32 shown in block form in FIG. 2. Control apparatus 32 comprises three identically configured current regulators: 34a, 34b and 34c, respectively, which each supply inverter 12 with inverter switching signals $S_1$, $S_2$ and $S_3$, respectively, in accordance with the difference in magnitude between a respective one of inverter phase current components $i_{as}$, $i_{bs}$ and $i_{cs}$, and a respective one of three sinusoidal reference signals supplied by a sine wave generator 35 in accordance with operator commands.

As each of current regulators 34a, 34b and 34c is configured of identical components and operates in a like manner, only the details of current regulator 34a are set forth. Current regulator 34a includes an amplitude limiter 36 which is supplied from sine wave generator 35 with one of three sinusoidal reference signals, each sinusoidal reference signal representing a respective phase component of desired inverter output current. The details of sine wave generator 35 will be described hereinbelow. Amplitude limiter 36, when supplied with a sinusoidal signal at its input, provides an amplitude-limited sinusoidal reference signal at its output to the non-invert input of a summing amplifier 40. Summing amplifier 40 is supplied at its invert input with the output signal of an associated one of current sensors 42a, 42b and 42c, respectively, which are each coupled in series with inverter 12 and a respective phase of machine 14, each current sensor providing an output signal which varies in accordance with an associated one of inverter phase current components $i_{as}$, $i_{bs}$ and $i_{cs}$, respectively. Summing amplifier 40 provides at its output a signal, proportional to the difference in magnitude between input signals supplied to the invert and noninvert summing amplifier inputs, to the input of a low pass filter 44.

A comparator 46 is coupled at the invert input to the output of low pass filter 44. The noninvert comparator input is coupled to circuit ground by a first resistance 48 and is coupled by a second resistance 50 to a voltage source (not shown) of magnitude-V where V is the magnitude of the dc output voltage of dc source 16. A third resistance 52 couples the output of comparator 46 to the noninvert comparator input so that a portion of the comparator output voltage is supplied to the noninvert comparator input. By supplying a portion of the comparator output voltage to the noninvert comparator input, the comparator output voltage, that is, switching signal $S_1$, becomes hysteresis limited. In practice, the ohmic values of resistances 48, 50 and 52 are chosen such that the hysteresis band about the comparator voltage, supplied to inverter 12, corresponds to a 50 ampere band about the desired inverter output current, thereby preventing switching of inverter transistors at a frequency in excess of the maximum transistor switching frequency. A diode 54 is coupled at the cathode to the output of comparator 46 and at the anode to circuit ground and clamps the comparator output voltage.

Sine wave generator 35 which supplies each of current regulators 34a, 34b and 34c with one of three sinusoidal signals, each signal being in three phase relationship with one another, is configured similarly to the sine wave generator described by J. Walden and F. Turnbull, both of General Electric Company, in their paper "Adjustable Voltage and Frequency Polyphase Sine Wave Generator" published in the Conference Record of the 1974 IEEE/IAS Annual Meeting (74CHO 833-41A) at pages 1015–1200. The amplitude and frequency of each of the three sinusoidal reference signals generated by sine wave generator 35 varies in accordance with an amplitude command signal A* and a frequency command signal F*, respectively, supplied to the amplitude input and frequency input, respectively, of the sine wave generator. In practice, the amplitude command signal A* varies in accordance with an operator-commanded inverter current amplitude. To avoid inverter instability at low frequencies as a consequence of regulating inverter switching device condition in accordance with inverter current, the inverter frequency command signal F* is varied in accordance with the difference in magnitude between an operator commanded machine phase angle relationship and the actual machine phase angle relationship. A summing amplifier 56 is supplied at the noninvert input with a signal sin $\theta^*$, proportional to the operator-commanded machine phase angle relationship magnitude. The invert summing amplifier input is supplied from an angle computation circuit 60, coupled to inverter 12 and to each of current sensors 42a, 42b and 42c, with a signal sin $\theta$, proportional to the actual machine phase angle relationship and which varies in accordance with inverter output voltage and current. In addition, angle computation circuit 60 also provides a pair of output signals, designated Torque and Flux, in accordance with inverter output current and output voltage, which signals are each proportional to the actual machine torque and to the actual air gap flux magnitudes, respectively. The usefulness of these signals will become apparent hereinafter.

Typically, angle computation circuit 60 is configured similarly to the angle computation circuit described in my copending application "Maintaining Synchronism of an Inverter Synchronous Machine Drive System at Light or Zero Machine Loads", filed on Sept. 28, 1979, Ser. No. 079,693, now U.S. Pat. No. 4,258,302, and assigned to General Electric Company. For a further understanding of angle computation circuit 60, reference should be made to that patent.

Summing amplifier 56 provides at its output, a signal, proportional to the difference in magnitude between input signals supplied to the invert and noninvert summing amplifier inputs, to the input of an amplifier 62. Amplifier 62 supplies sine wave generator 35 with frequency command signal F* in accordance with the output signal magnitude of summing amplifier 56.

Faster transient response and improved regulation of machine torque is provided by control apparatus 32 by the addition of a first and second control loops 75 and 80, respectively, which each operate to supply sine wave generator 35 with machine phase angle command signal sin $\theta^*$ in accordance with machine torque, and to supply a current amplitude signal A* in accordance with machine air gap flux, respectively. Control loop 75 comprises a summing amplifier 82 which is supplied at the noninvert input with a torque command signal Torque* proportional to an operator-commanded machine torque magnitude. The invert summing amplifier input is coupled to angle computation circuit 60 and is supplied therefrom with the Torque signal proportional to the actual machine torque magnitude. Summing amplifier 82 provides an output signal, proportional to the difference in magnitude between signals supplied to the invert and noninvert summing amplifier inputs, to the input of an amplifier 84. Amplifier 84 provides an output signal, proportional to the summing amplifier output signal, to the input of an amplitude limiter 86. Amplitude limiter 86 supplies the machine phase angle command signal sin $\theta^*$ to the noninvert input of summing amplifier 56 in accordance with the output signal magnitude of amplifier 84.

Control loop 80 includes a summing amplifier 88 which is supplied at the noninvert input with a flux command signal, Flux*, which varies in accordance with an operator commanded air gap flux magnitude. The invert input of summing amplifier 88 is coupled to angle computation circuit 60 and is supplied therefrom with the Flux signal proportional to the actual machine air gap flux magnitude. Summing amplifier 88 provides an output signal, proportional to the difference in magnitude between input signals supplied to the invert and noninvert summing amplifier inputs, to the input of an amplifier 90 which supplies sine wave generator 35 with current amplitude command signal A* in accordance with the output signal magnitude of summing amplifier 88.

Note that although control loops 75 and 80 have been described with respect to control circuit 32, control loops 75 and 80 may each be equally useful to supply a machine phase angle command signal sin $\theta^*$ in accordance with machine torque, and to supply a current amplitude signal A* in accordance with machine air gap flux, respectively, to a conventional pulse width modulated inverter drive system controlled in accordance with the triangle interception technique.

Operation of control apparatus 32 to supply inverter 12 of FIG. 1 with switching signals $S_1$, $S_2$ and $S_3$ will now be set forth with respect to FIGS. 3a and 3b. As each of current regulators 34b and 34c operates to supply inverter 12 with a respective one of switching signals $S_2$ and $S_3$ in a manner identical to the operation of current regulator 34a, only the details of current regulator 34a operation are set forth.

Initially, it is assumed that the output voltage magnitude of comparator 46 of FIG. 2, and hence, inverter switching signal $S_1$, is at a logical "1" level as indicated by the waveform of $S_1$ illustrated in FIG. 3a. With switching signal $S_1$ at a logical "1" level, transistor 18a of FIG. 1 is rendered conductive and inverter phase current $i_{as}$ increases linearly as evidenced by the waveform of $i_{as}$ which is represented by waveform 92 in FIG. 3b. When, at time $t_1$ the output signal magnitude of current sensor 42a, which varies in accordance with $i_{as}$, so exceeds the output signal magnitude of amplitude limiter 36, whose output signal waveform is represented by waveform 94 in FIG. 3b, such that the difference between the output signal magnitude of current sensor 42a and the output signal magnitude of amplitude limiter 36 exceeds the upper hysteresis limit of comparator 46, which limit is indicated by the dashed line segments above waveform 94, then the output signal magnitude of comparator 46, and hence, switching signal $S_1$, deviates from a logical "1" to a logical "−1" level. As a consequence, transistor 18a of FIG. 1 is rendered nonconductive. After a period of 25µ seconds beginning with the deviation of switching signal $S_1$, transistor 18b of FIG. 1 becomes conductive. With transistor 18b now conductive, $i_{as}$ decreases until time $t_2$ when the magnitude difference between output signals provided by current sensor 42a and amplitude limiter 36 exceeds the lower hysteresis limit of comparator 46, represented by the dashed line segment below waveform 94, at which time, the output signal magnitude of comparator 46, and hence $S_1$, changes from a logical "−1" level to a logical "1" level. After an interval of 25µ seconds following the change of switching signal $S_1$, transistor 18b of FIG. 1 again becomes conductive until time $t_3$ when the above sequence of events is repeated.

Operating as described above, control circuit 32 minimizes peak inverter currents by regulating transistor conduction in accordance with upper and lower hysteresis limits about the desired inverter phase current, as represented by a respective one of the sinusoidal reference signals generated by sine wave generator 35. By controlling the amplitude and frequency of each of the three sinusoidal output signals of sine wave generator 35 in accordance with a feedback air gap flux signal, and a feedback torque signal, respectively, objectionable jumps in inverter output current are virtually eliminated, thereby assuring smooth machine operation. In addition, by controlling the frequency of each of the sinusoidal reference signals in accordance with the difference between an operator-commanded machine phase angle relationship which varies in accordance with a feedback torque signal, and the actual machine phase angle relationship magnitude, machine stability is assured.

Another advantage of controlling inverter 12 of FIG. 1 in accordance with inverter current as described is that once maximum inverter output current has been commanded, the inverter smoothly transitions between pulse width modulation operation and square wave operation because control circuit 32 of FIG. 2 then forces the transistors of each transistor pair to switch at a higher frequency during the zero crossings of inverter output voltage causing the resultant inverter output voltage waveform to more closely approximate a square wave, thereby minimizing inverter peak currents while maximizing machine torque.

While only certain features of the invention have been shown by way of illustrations, many changes and modifications will occur to those skilled in the art. For example, the control apparatus of the present invention, while described with respect to a transistorized inverter, may be equally useful for controlling a thyristor inverter. It is, therefore, to be understood, that the appended claims are intended to cover all such changes and modifications as fall within the true spirit of the invention.

What is claimed is:

1. An alternating current machine drive system comprising:
    a multiphase alternating current machine;
    an inverter coupled to said multiphase machine for supplying said machine with alternating current, each phase component of alternating current supplied by said inverter to said multiphase machine varying in frequency and amplitude in accordance with a respective phase of inverter switching signals; and
    control means coupled to said inverter and said multiphase alternating current machine for supplying said inverter with inverter switching signals for each phase of said inverter, said control means including
    means for generating a current amplitude command;
    means for generating a machine phase angle command;
    reference signal generating means for supplying a multiphase reference signal which varies in frequency and amplitude in accordance with said machine phase angle command and said current amplitude command, respectively; and
    a plurality of current regulator means corresponding in number to the number of phases of said multiphase alternating current machine, each of said plurality of current regulator means coupled to said multiphase alternating current machine and to said reference signal generating means, each regulator means providing a current error signal proportional to the difference in magnitude between a respective phase component of actual inverter current and a respective phase component of said multiphase reference signal and supplying inverter switching signals to one phase of said inverter in accordance with the deviation in magnitude of said current error signal from said respective phase component of actual inverter current.

2. The drive system according to claim 1 wherein said multiphase machine comprises an induction machine.

3. The invention according to claim 1 wherein said multiphase machine comprises a synchronous machine.

4. The drive system according to claim 1 wherein each of said plurality of current regulators comprises:
    an amplitude limiter coupled to said reference signal generating means for providing an amplitude-limited reference signal at an output;
    a summing amplifier having a first input adapted to be supplied with a signal proportional to said respective phase component of actual inverter current and having a second input coupled to said amplitude limiter output for receiving said amplitude limited reference signal, said summing amplifier providing an output signal proportional to the difference in magnitude between input signals supplied to the first and second summing amplifier inputs; and a comparator having an output, a first input coupled to said summing amplifier for receiving said summing amplifier output signal and having a second input adapted to be supplied with a voltage of preset magnitude and adapted to be supplied with a portion of the comparator output voltage, said comparator providing said respective one of said inverter switching signals at said output in accordance with the difference in magnitude between voltages supplied to the first and second comparator inputs.

5. The drive system according to claim 4 further including a low pass filter coupled between said summing amplifier and said comparator.

6. The drive system according to claim 1 wherein said means for generating a machine phase angle command comprises:

a first control loop for supplying said reference signal generating means with said machine phase angle command in accordance with the magnitude of machine torque.

7. The drive system according to claim 6 wherein said first control loop comprises:

an angle computation circuit coupled to said multiphase machine and said inverter for providing, in accordance with inverter output voltage and inverter output current, a torque signal porportional to the actual magnitude of machine torque;

a summing amplifier having a first input coupled to said angle computation circuit for receiving said torque signal and having a second input adapted to be supplied with a torque command signal proportional in magnitude to an operator-commanded machine torque, said summing amplifier providing an output signal which varies in accordance with the difference in magnitude between input signals supplied to said the first and second summing amplifier inputs;

a second amplifier coupled to said summing amplifier for providing said machine phase angle command signal in accordance with said summing amplifier output signal; and an amplitude limiter coupled between said reference signal generating means and said second amplifier for amplitude-limiting said machine phase angle command signal.

8. The drive system of claim 1 wherein said machine phase angle is the angle between the current stator vector and the flux vector of the machine.

9. The drive system according to claim 1 wherein said reference signal generating means comprises:

an angle computation circuit coupled to said inverter and said multiphase machine for providing, in accordance with inverter output current and inverter output voltage, a machine phase angle signal which varies in accordance with the actual machine phase angle relationship magnitude;

a summing amplifier having a first input adapted to be supplied with said machine phase angle command signal and a second input coupled to said angle computation circuit for receiving said machine phase angle signal, said summing amplifier providing an output signal proportional to the difference in magnitude between input signals supplied to the first and second summing amplifier inputs;

a second amplifier coupled to said summing amplifier for providing a frequency command signal in accordance with said summing amplifier output signal; and a reference wave generating having a first input coupled to said second amplifier and a second input adapted to be supplied with said current amplitude command signal, said reference wave generator generating a multiphase sinusoidal reference signal, the amplitude and frequency of each phase component of said multiphase reference signal varying in accordance with said current amplitude command signal and said frequency command signal, respectively.

10. A method for controlling inverter switching device conduction in an alternating current machine drive system comprised of a multiphase alternating current machine and an inverter configured of a plurality of pairs of switching devices, the switching devices of each pair coupled in series aiding fashion, and each of the pairs of series-coupled switches adapted to be coupled across a direct current source, said method comprising the steps of:

providing a multiphase reference signal with each phase component of said multiphase reference signal varying in frequency in response to the difference in magnitude between a machine phase angle command and a signal proportional to the actual machine phase angle and varying in amplitude in response to an operator amplitude command;

generating a plurality of current error signals such that each of said plurality of current error signals varies in accordance with the difference in magnitude between a phase component of actual inverter current and a respective phase component of said multiphase reference signal;

providing a plurality of inverter switching signals to each phase of said inverter with each phase varying in accordance with the difference in magnitude between a respective one of said plurality of current error signals and said respective phase component of actual inverter current; and alternately rendering the switching devices of each pair of inverter switching devices conductive in accordance with a respective phase of said inverter switching signals.

11. The method according to claim 10 wherein said machine phase angle command signal is varied in accordance with the difference in magnitude between an operator-varied torque command signal and a signal proportional to actual machine torque.

12. The method according to claim 10 wherein the amplitude of said each phase component of said multiphase reference signal is varied in accordance to the difference in magnitude between an operator-varied machine air gap flux command signal and a signal proportional to the actual machine air gap flux.

13. The drive system according to claim 1 wherein said means for generating a current amplitude comprises:

a second control loop for supplying said reference signal generating means with said current amplitude command in accordance with the magnitude of machine air gap flux.

14. The drive system according to claim 13 wherein said second control loop comprises:

an angle computation circuit coupled to said multiphase machine and said inverter for providing, in accordance with inverter output current and inverter output voltage, a flux signal proportional to the actual magnitude of machine air gap flux;

a summing amplifier having a first input coupled to angle computation circuit for receiving said flux signal and having a second input adapted to be supplied with a flux command signal varying in accordance with an operator-commanded machine air gap flux magnitude, said summing amplifier providing an output signal proportional to the difference in magnitude between input signals supplied to the first and second summing amplifier inputs; and a second amplifier coupled between said summing amplifier and said reference signal generating means for supplying said reference signal generating means with said current amplitude command signal in accordance with said summing amplifier output signal.

15. The method of claim 10 wherein said machine phase angle is the angle between the current stator vector and the flux vector of the machine.

* * * * *